ns of the oil film between the engageable surfaces, and

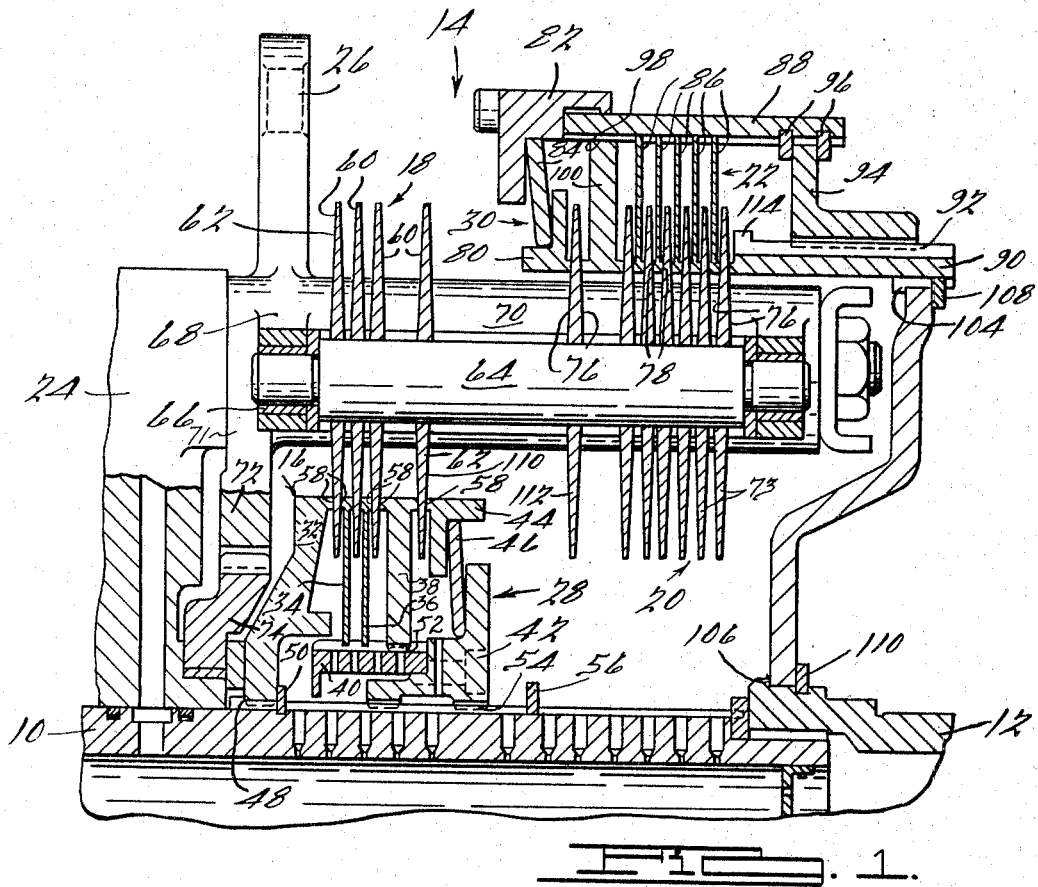
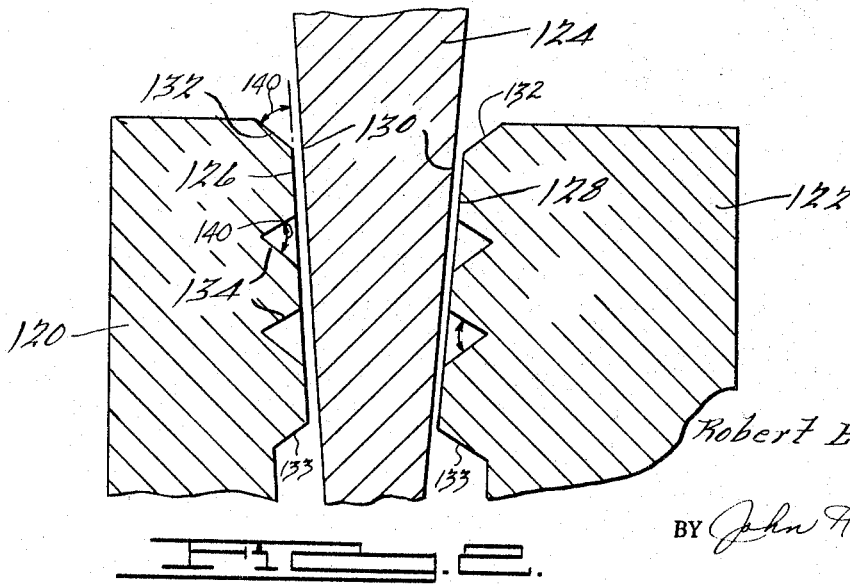

United States Patent Office 3,318,164
Patented May 9, 1967

3,318,164
FRICTION DISC DRIVE
Robert E. McCollum, Birmingham, Mich., assignor to Ford Motor Company, Dearborn, Mich., a corporation of Delaware
Filed Dec. 1, 1964, Ser. No. 415,123
10 Claims. (Cl. 74—199)

This invention relates in general to a torque transmitting mechanism, and more particularly to a friction disc drive having an infinitely variable torque ratio characteristic. It is an improvement of the disc drive described and illustrated in U.S. Patent 3,099,927, Infinitely Variable Transmission.

The above-mentioned patent describes an infinitely variable speed drive in which one set of friction discs is arranged in interdigited relationship with a second set of discs with the rim portions of one contacting the mating surfaces of the other. Each of the rim portions has a lateral friction surface that is engageable with the mating lateral surface of a conically profiled disc, and the two surfaces are clamped togethed by suitable fluid pressure means. The discs operate within a housing containing lubricating oil that is sprayed or otherwise introduced into the contact or patch area between the mating friction surfaces so that a thin film of lubricating oil is formed in this region. A drive is transmitted from one disc to the other through this film of oil, in a known manner.

In the above construction, the radially inward and outward portions of the rim lateral contact surface are formed with sharp edges that provide a high pressure concentration at each of these points when the discs are engaged. In effect, the sharp edges act as inhibitors to an excess of flow of lubricating oil past the edges towards the middle of the contact surface. Since oil flow would normally increase with speed, the rate of build-up of the oil film is maintained low, and crossflow in the contact area is reduced. This will become clearer by considering the prior art constructions.

Substantially of the friction disc drives of the prior art have at least one set of discs with laterally extending rims. The rims have a lateral friction face that is engageable with the conically profiled face of a cooperating disc. In the constructions prior to Patent 3,099,927, the rim lateral contact surfaces had radially inward and outward edges that were essentially rounded so that the pressure gradient on the oil film due to the clamping forces rose progressively from the edges towards the center of the surface contact area. As the speed increased, therefore, more oil tended to flow into and towards the center of the contact area, causing an excessive build-up in the thickness of the oil film and also resulting in considerable crossflow radially outwardly from the center. This resulted in a loss of torque transmitting capacity at higher speeds, a reduction in the mechanical efficiency of the mechanism, and a high rate of wear of the friction discs.

The construction described in U.S. 3,099,927 minimized these disadvantages by providing sharp edges to the radially inner and outer portions of the disc rims. These sharp edges, as stated previously, provided high pressure concentrations on the oil film at each of the edges, which impeded the flow of oil into the contact area and also reduced crossflow in the contact area.

The present invention constitutes a further improvement over the prior art. It provides one or more sharp-edged annular grooves in one of the faces of the contacting surfaces so that the surface is in effect broken up into a plurality of cooperating sharp-edged contact surfaces. This provides a progessive control of the build-up in thickness of the oil film between the engageable surfaces, and makes the use of large diameter discs feasible. That is, since the torque transmitting capacity of a disc drive varies in proportion to the contact area, increased capacity requires larger contact areas (and larger discs), and higher clamping forces. However, with larger contact areas, the oil film thickness between the contacting surfaces will also increase, as well as the crossflow in the contact area. This is due to the fact that as the distance between the edges of the contact surface becomes large, and the clamping forces are increased, the pressure on the oil film in the center of the contact area increases to a point providing a secondary pressure concentration near the center of the contact area; this induces crossflow in the contact area, and increases the film thickness at that point.

The primary object of the invention, therefore, is to provide a friction disc drive construction wherein at least one of the contacting face surfaces of the discs is provided with one or more sharp-edged annular depressions to reduce crossflow and retard the rate of oil film formation in the contact area between the discs.

Other objects, features and advantages will become apparent upon reference to the succeeding, detailed description of the invention and to the drawings illustrating the preferred embodiment thereof; wherein, FIGURE 1 shows a cross-sectional view of a friction drive embodying the invention; and, FIGURE 2 is an enlarged cross-sectional view of portions of the cooperating discs of FIGURE 1.

FIGURE 1 shows, in general, a friction disc type transmission 1 drivingly connecting a power input shaft 10 to a power output shaft 12. The transmission is typical of many in which the invention can be used. It has a set 16 of inner friction discs in interdigital engagement with a first set 18 of intermediate discs, a second spaced set 20 of intermediate discs being engaged with a set 22 of outer friction discs. The discs of set 22 have a splined connection to output shaft 12. Intermediate disc sets 18 and 20 are rotatably supported on a stationary axis 23 secured in a portion of the transmission housing 24. The disc axis, however, can be adjusted radially in a manner to be described later, by a lever arm 26 to effect a change in the drive ratio through the transmission.

Intermediate disc sets 18 and 20 are clamped against the inner and outer disc sets by two independently operating torque sensitive devices 28 and 30 providing clamping forces that vary in proportion to the torque to be transmitted from or to the power input and output shafts, as will also be described in more detail later. Suffice it to say at this point, that rotation of the inner disc set 16 in one direction rotates disc sets 18 and 20 in the opposite direction about their stationary axis to drive the disc set 22 and output shaft 12 in a direction opposite to that of input shaft 10, and at speeds varying from a reduction to an overdrive, as determined by the radial position of the axis 23 of disc sets 18 and 20. The speed variation, of course, also depends upon the selection of the diameters of the different discs. The torque sensitive devices 28 and 30 are helically splined to the power input and output shafts to provide axial disc clamping forces proportional to the torque to be transmitted.

More specifically, input shaft 10, which may be driven by any suitable source of power, such as, for example, the internal combustion engine for a motor vehicle, is drivingly connected by straight splines to an annular friction disc member 32 constituting an end element of disc set 16. The set includes three intermediate annular disc members 34, 36 and 38 each slidably connected by straight splines to an extension 40 of a disc carrier 24. The carrier also floatingly supports an end friction disc 44 on a Belleville spring 46.

Disc 32 is fixed against axial movement between a shoulder 48 on input shaft 10 and a snap ring 50. Intermediate discs 34, 36 and 38 can slide axially on their splines, disc 38 at times seating against a step 52 in the carrier extension spline for a purpose to be described later. Disc carrier 42 is connected to input shaft 10 by an internal helical spline 54. This permits it to slide to the left or right in FIGURE 1 between a stop ring 56 and snap ring 50 in response to a torque differential between input shaft 10 and carrier 42 to clamp the discs of sets 16 and 18 together.

The discs of inner set 16 each have conically profiled lateral rim surfaces 58 engaging a mating lateral friction surface 60 on spaced annular friction discs 62. Discs 62 are slidably but nonrotatably secured on one end of a shaft 64. The shaft is rotatably mounted on bearings 66 in bosses 68 that project from and are integral with adjusting arm 26.

Adjusting arm 26 is essentially one leg of a right angle bell-crank lever with bosses 68 constituting the other leg. The fulcrum for the lever comprises a sleeve 70 rotatable about a stationary shaft (not shown) extending cantilever-like from transmission housing 24. Further details of the construction and support of the lever are not given since they are known, and may be similar to those shown in United States Patent No. 3,099,927, "Infinitely Variable Transmission," issued Aug. 6, 1963. Suffice it to say that when arm 26 is rotated in either direction by any suitable means, shaft 64 is pivoted about the stationary shaft enclosed by sleeve 70 and swings radially upwardly or downwardly, as the case may be.

Sleeve 70 has a radial extension 71 formed with a gear segment 72. This gear segment meshes with an annular gear 74 that is rotatably mounted on shaft 10 for centering and guiding the movement of sleeve 70. Thus, intermediate discs 62 can be moved radially inwardly or outwardly to change the radial distance from their axis 23 to the points of contact with the rim portions of the discs of inner set 16. The drive ratio is, therefore, varied by the change in speed of rotation of shaft 64.

The friction discs 73 of the second stage disc set 20 are nonrotatably but slidably splined to the opposite end of shaft 64. These discs, like discs 62, have opposed conically profiled lateral surfaces 76 engaged by the mating rim portions 78 of the spaced outer friction discs of set 22.

The discs of set 22 are constructed and supported in a manner similar to those of the inner disc set 16. That is, the outer disc set includes an end stage 80 floatingly supported on an annular disc carrier 82 by a Belleville spring 84; six intermediate discs 86 each connected by a straight spline to a drum-like extension 88 of carrier 82; and another end disc 90 connected by a helical spline 92 to a ring flange 94. The ring flange has a straight splined connection to carrier extension 88 and is fixed against axial movement by snap rings 96. End disc 90 is connected to output shaft 12 by a radially depending member 102 axially positioned between shoulders 104, 106 and snap rings 108, 110 on the disc portion and output shaft, respectively.

Like disc carrier extension 40, the spline on outer extension 88 has a step or shoulder 98 against which the intermediate disc 100 is seated at times. With this construction, relative rotation between ring flange 94 and end ring disc 90, induced by a torque differential between the members, causes carrier 82 to move axially in either direction to clamp the interdigited planet and ring discs together with forces varying as a function of the direction and torque to be transmitted.

In operation, with shafts 10 and 12 stationary, the parts are in the positions shown in FIGURE 1. Springs 46 and 84 preload the inner and outer end discs 44 and 80 against the end intermediate discs 110 and 112 by seating discs 38 and 100 against steps 52 and 98 in the splines of carrier extensions 40 and 88 to form closed spring force transmitting circuits. Discs 38 and 100, therefore, act as reaction members initially, under zero torque load conditions as well as during light torque loads, to always maintain the transmission conditioned for a drive. That is, inner disc 44 spring loads intermediate disc 110 against inner disc 38, and outer disc 80 spring loads intermediate disc 112 against outer disc 100 to transmit torque through the transmission. The remaining discs are unloaded at this time.

Upon rotation of shaft 10 imparting a high starting torque to both inner disc 32 and disc carrier 42, the initial torque and speed differential between input shaft 10 and disc carrier 42 causes the carrier to move along helical spline 54 to the left to provide an axial thrust force clamping the discs of sets 16 and 18 together. Relative angular movement between the discs 33, 36, 38 on the carrier and end disc 32, due to the straight spline connection of disc 32 to input shaft 10 as compared to the helical spline connection of carrier 42 to input shaft 10, is absorbed between disc 32 and the adjacent planet discs. This results in a viscous damping to control the rate of load increase.

When the axial thrust load exceeds the preload of spring 46, disc 38 unseats from the carrier spline step 52, and all the discs of sets 16 and 18 become uniformly loaded. As the thrust load increases to a maximum, which is substantially instantaneous under high torque starting conditions, spring 46 flattens out until the lateral rim of the spring bears directly against the face of the disc carrier, thus limting the spring stress.

The discs of set 18 are now rotating, their speed being determined by the radial distance from the axis 23 of shaft 64 to their points of contact with the rims of the discs of set 16. The drive of disc set 18 is, therefore, transmitted along the planet shaft 64 to the second set of discs 20 causing rotation of the outer disc set 22. The torque differential between the input end and intermediate discs 80 and 86, and thus carrier 82 and ring flange 94, relative to disc 90 and output shaft 12, causes an axial movement to the right of ring flange 94 and carrier 82 on helical spline 92 to flatten spring 84 against the carrier, unseat disc 100 from step 98, and uniformly load the outer discs 22 with a clamping force proportional to the torque to be transmitted.

Thus, a drive is transmitted between the input and output shafts. As in connection with the inner discs, the slight angular rotation of the discs 86 and end disc 80 relative to the opposite end disc 90, due to the movement of the carrier and discs along the helical spline, is absorbed between the end and other discs, resulting in a viscous damping. Also, like the inner disc set 16, at zero or light torque loads, only the discs 80, 112, and 100 are loaded since the light torque load is unable to overcome the force of spring 84 and move the carrier 82 to the right. Thus, disc 100 remains against the reaction step 98. Since the contact rim of end disc 90 does not move axially, the five adjacent intermediate discs 86 remain unloaded at this zero or light torque condition.

As the amount of torque transmitted from the discs of set 16 to discs 60 increases, the torque load decreases. This causes a backing off to the right of the inner disc carrier 42 along helical spline 54 to reduce the disc clamping forces in proportion to this decrease in torque differential. This same action, only to the left, occurs in connection with the outer disc carrier 82. Thus, the clamping forces are progressively reduced until inner disc 38 and outer disc 100 again seat against steps 52 and 98, not necessarily simultaneously, however, to reduce the clamping forces to that provided only by the preload of springs 46 and 84. At very light torque loads, therefore, only end discs 110 and 112 of intermediate sets 18 and 20 are loaded to transmit the torque load between the power shafts.

These same inner and outer end discs 44 and 80 carry the torque load upon a reversal in the direction of torque flow, such as during coasting, or for providing engine braking, or a push-start, when output shaft 12 becomes the driver. In this case, the output shaft connected disc 90 rotates ahead of the ring flange 94 and discs 86 and 80 and carrier 82 to back the carrier axially to the left along spline 92 until ring flange 94 abuts stop 114, which is the light torque load position. The clamping force at this time, therefore, is that provided solely by the preload of spring 84 against disc 112. Simultaneously, the drive of inner disc carrier 42 by the disc 110 causes the carrier to move along the helical spline to the right to abut stop 56, at which point, the clamping force is that provided solely by the preload of spring 46. Thus, at this time, the intermediate and end outer discs 86 and 90, and intermediate and end inner discs 36, 34 and 32 are unloaded, the torque being transmitted entirely by engaged outer discs 80 and 100 and disc 112, and disc 110 and inner discs 44 and 38.

If a change in speed ratio is desired, the positioning arm 26 is rotated to radially move shaft 64, and, therefore, the two intermediate disc sets 18 and 20. A radially inward movement increases the speed to output shaft 12 due to the decrease in the distance between the inner discs and the axis 23 of shaft 64 and increase in distance from the axis to the outer discs 73. The outer disc contacts, however, are at a greater radius from the axis of shaft 64 than before, and, therefore, have an even greater peripheral velocity.

Conversely, a decrease in speed of output shaft 12 with respect to that of input shaft 10 can be accomplished by moving arm 26 to move the shaft 64 radially outwardly, thereby decreasing the speed of shaft 64 and reducing the speed of the outer discs.

Referring now more particularly to the invention, FIGURE 2 shows an enlarged view of the details of the rim portions 120 and 122 of two discs, of say, inner set 16, for example, engageable with a disc 124 of intermediate set 18. It will be clear that the cooperating discs of the other sets would be formed in a similar manner.

The central disc 124 has a conical cross section with the minimum axial cross-sectional dimension occurring at its outermost or lowermost extremity. The engaging discs are formed with rim portions 120 and 122, and have radially extending face surfaces 126 and 128 that are essentially parallel to and mate with the tapered conical surface 130 of disc 124. Each of the surfaces 126, 128 and 130 is flat, the rim surfaces 126 and 128 having sharp or pointed edges 132 and 133 at their extremities.

The intermediate portion of rim surfaces 126 and 128 has, in this case, two radially spaced annular grooves 134. The grooves are essentially V-shaped in cross section, and have sharp or pointed edges at the point of juncture with the flat engaging surfaces 126 and 128. Lubricating oil is adapted to be supplied continuously, by means not shown, to the cooperating faces 126, 130, and 130, 128 during operation. An oil film is, therefore, developed in each of the contact regions.

The sharp points of discontinuity that the sharp edges form with respect to the flat faces 126 and 128 provide radially spaced points of high pressure concentration that reduce crossflow in the contact area. That is, the sharp edges 132 and 133 act as initial resistances to a large flow of oil into the contact area from either direction. The intermediate sharp-edged grooves 134 act as further or additional barriers to the flow and impede a secondary build-up of the oil film thickness in the contact area between the edges. The lower pressure concentration in the intermediate portions between the sharp breaks in the surface minimizes the tendency of the oil to flow outwardly from the center, and, therefore, minimizes crossflow.

The number of grooves 134 that are necessary would, of course, be a matter of choice, and will depend upon the contact patch length of a particular installation. The greater the contact area, the more annular grooves will be needed to break up the contact surface into lengths of such extent that they do not permit an excessive build-up in the oil film thickness or crossflow.

The particular angle 140 that the side of the grooves 134 makes with the faces 126 or 128 is, of course, chosen in accordance with the operating conditions that are desired, and can be varied to provide the desired thickness to the oil film in a manner more particularly described in U.S. 3,099,927. The groove angles would be similar to the angles of edges 132 and 133.

From the foregoing, it will be seen that the invention provides a disc drive construction that makes the use of high torque capacity, large diameter discs feasible by suitably controlling the pressure concentrations on the oil film in the contact area.

While the invention has been illustrated in its preferred embodiment in the figures, it will be clear to those skilled in the arts to which the invention pertains that many changes and modifications may be made thereto without departing from the scope of the invention.

I claim:

1. A friction disc drive comprising driving and driven friction discs having engageable mutually adjacent facing friction surfaces, means mounting said discs for relative rotation about parallel axes, and surfaces having a film of lubricant therebetween, means clamping said surfaces against one another for the drive of one by the other through said film of lubricant, and means to retard the rate of lubricant film formation between said surfaces comprising a sharp-edged depression in the face of one of said surfaces.

2. A friction disc drive comprising driving and driven friction discs having engageable mutually adjacent facing friction surfaces, means mounting said discs for relative rotation about parallel axes, said surfaces having a film of lubricant therebetween, means clamping said surfaces against one another for the drive of one by the other through the said film of lubricant, and means to retard lubricant crossflow in the contact area of said surfaces comprising a sharp-edged annular depression in the contact area of the face of one of said surfaces.

3. A friction disc drive comprising driving and driven friction discs having engageable mutually adjacent facing friction surfaces, means mounting said discs for relative rotation about parallel axes, said surfaces having a film of lubricant therebetween, means clamping said surfaces against one another for the drive of one by the other through the said film of lubricant, and means to retard the rate of lubricant film formation between said surfaces comprising a sharp-edged annular substantially V-cross-sectional shaped depression in the face of one of said contact surfaces.

4. A friction disc drive comprising driving and driven friction discs having engageable mutually adjacent radially extending friction surfaces with a film of lubricant therebetween, means mounting said discs for relative rotation about parallel axes, means biasing said surfaces towards one another for the drive of one of said surfaces by the other through the said film of lubricant, and means to retard the lubricant film thickness build-up between said surfaces, said latter means comprising a plurality of radially spaced annular sharp-edged depressions in the face of one of said surfaces.

5. A friction disc drive comprising driving and driven friction discs having engageable mutually adjacent radially extending friction surfaces with a film of lubricant therebetween, means mounting said discs for relative rotation about parallel axes, means biasing said surfaces towards one another for the drive of one of said surfaces by the other through the said film of lubricant, and means to retard lubricant crossflow in the contact area between said surfaces, said latter means comprising a plurality of radially spaced annular sharp-edged depressions in the face of one of said surfaces.

6. A friction disc drive comprising, driving and driven discs in interdigited relationship and having engageable lateral surfaces of mating conical profiles, said surfaces being separated by a film of lubricant, means mounting said discs for relative movement about parallel axes, means clamping said mating surfaces together for the drive of said discs by each other through the said film of lubricant, and means comprising a sharp-edged depression in the contact area of the face of one of said surfaces for retarding the rate of lubricant film formation in the contact area.

7. A friction disc drive comprising, driving and driven discs in interdigited relationship and having engageable lateral surfaces of mating conical profiles, said surfaces being separated by a film of lubricant, means mounting said discs for relative movement about parallel axes, means clamping said mating surfaces together for the drive of said discs by each other through the said film of lubricant, and means comprising a plurality of radially spaced sharp-edged annular depressions in the face of one of said surfaces for retarding the rate of lubricant film formation in the contact area.

8. A friction disc drive comprising, driving and driven discs in interdigited relationship and having engageable lateral surfaces of mating conical profiles, said surfaces being separated by a film of lubricant, means mounting said discs for relative movement about parallel axes, means clamping said mating surfaces together for the drive of said discs by each other through the said film of lubricant, and means comprising a sharp-edged annular groove in the contact area of the face of one of said surfaces for retarding the rate of lubricant film formation in the contact area.

9. A friction disc drive comprising, driving and driven discs in interdigited relationship and having engageable lateral surfaces of mating conical profiles, said surfaces being separated by a film of lubricant, means mounting said discs for relative movement about parallel axes, means clamping said mating surfaces together for the drive of said discs by each other through the said film of lubricant, and means comprising a plurality of radially spaced sharp-edged annular grooves in the contact area of the face of one of said surfaces for retarding the rate of lubricant film formation in the contact area.

10. A friction disc drive comprising, driving and driven discs in interdigited relationship and having engageable lateral surfaces of mating conical profiles, said surfaces being separated by a film of lubricant, means mounting said discs for relative movement about parallel axes, and means clamping said mating surfaces together for the drive of said discs by each other through the said film of lubricant, the radially inward and outward portions of one of said friction surfaces having sharp edges and the intermediate face portion having an annular substantially V-shaped groove with sharp edges for retarding the rate of lubricant film formation in the contact area.

References Cited by the Examiner

UNITED STATES PATENTS

| 2,020,748 | 11/1935 | Waseige | 192—113.2 |
| 2,556,809 | 6/1951 | Hobbs | 192—113.2 |
| 2,690,248 | 9/1954 | McDowall | 192—113.2 |
| 2,733,798 | 2/1956 | Almen et al. | 192—113.2 |
| 2,775,331 | 12/1956 | Peterson | 192—113.2 |
| 3,073,424 | 1/1963 | Russell | 192—113.2 |
| 3,099,927 | 8/1963 | Anderson | 74—199 X |

FOREIGN PATENTS

| 1,386,365 | 12/1964 | France. | |

DONLEY J. STOCKING, *Primary Examiner.*

DAVID J. WILLIAMOWSKY, *Examiner.*

L. H. GERIN, *Assistant Examiner.*